United States Patent
Sikra

(10) Patent No.: US 9,601,096 B2
(45) Date of Patent: Mar. 21, 2017

(54) CYMBAL HOLDER WITH SLOTTED THREADS AND PLUNGER

(71) Applicant: Drum Workshop, Inc., Oxnard, CA (US)

(72) Inventor: Richard A. Sikra, Thousand Oaks, CA (US)

(73) Assignee: DRUM WORKSHOP, INC., Oxnard, CA (US)

( * ) Notice: Subject to any disclaimer, the term of this patent is extended or adjusted under 35 U.S.C. 154(b) by 0 days.

(21) Appl. No.: 14/506,350

(22) Filed: Oct. 3, 2014

(65) Prior Publication Data
US 2015/0096430 A1   Apr. 9, 2015

Related U.S. Application Data

(60) Provisional application No. 61/886,505, filed on Oct. 3, 2013.

(51) Int. Cl.
| | |
|---|---|
| G10D 13/02 | (2006.01) |
| G10D 13/06 | (2006.01) |
| F16B 39/32 | (2006.01) |

(52) U.S. Cl.
CPC .......... *G10D 13/065* (2013.01); *F16B 39/32* (2013.01)

(58) Field of Classification Search
CPC ....... G10D 13/065; F16B 39/32; F16B 39/34; F16B 21/165
See application file for complete search history.

(56) References Cited

U.S. PATENT DOCUMENTS

| | | | | |
|---|---|---|---|---|
| 127,320 | A * | 5/1872 | Dinsmore | 411/328 |
| 179,994 | A * | 7/1876 | Brallier | 411/327 |
| 239,124 | A * | 3/1881 | Tombow | 411/327 |
| 409,204 | A * | 8/1889 | Jenkins | 411/294 |
| 477,555 | A * | 6/1892 | Lame et al. | 411/298 |

(Continued)

FOREIGN PATENT DOCUMENTS

| | | |
|---|---|---|
| FR | 1342929 A | 11/1963 |
| GB | 126293 A | 3/1920 |

OTHER PUBLICATIONS

Search Report from Appl. No. PCT/US14/59155, dated Mar. 19, 2015.

(Continued)

*Primary Examiner* — Robert W Horn
(74) *Attorney, Agent, or Firm* — Koppel, Patrick, Heybl & Philpott

(57) ABSTRACT

A clutch for use in a hi-hat percussion assembly is disclosed. The clutch can included a threaded bolt that includes slots, and a nut that includes an indexing means such as a plunger. An elastic holding means can be used to exert pressure on the indexing means, such as when the indexing means is rigid, for example. The plunger can be configured to engage a slot upon rotation of the nut to lock the nut into place. While in a locked position, unwanted displacement of the nut, including rotational displacement that may be caused by forceful and rapid movements of a drummer, can be reduced, prevented, and/or eliminated. Using a force greater than that required to simply turn the nut while in an unlocked position, the nut can be rotated to disengage the plunger from the slot and return the nut to an unlocked position.

33 Claims, 6 Drawing Sheets

(56) References Cited

U.S. PATENT DOCUMENTS

| | | | | |
|---|---|---|---|---|
| 857,869 A * | 6/1907 | Carlson | | 411/328 |
| 872,897 A * | 12/1907 | Chapman et al. | | 411/292 |
| 889,755 A * | 6/1908 | Brown | | 411/296 |
| 916,171 A * | 3/1909 | Lawrence | | 411/327 |
| 940,267 A * | 11/1909 | McCoy | | 411/298 |
| 999,632 A * | 8/1911 | Covert | | 411/199 |
| 1,066,982 A * | 7/1913 | Benson | | 411/198 |
| 1,075,226 A * | 10/1913 | Schotsch | | 411/328 |
| 1,085,080 A * | 1/1914 | Fitzgerald | | 411/329 |
| 1,099,005 A * | 6/1914 | Young | | 411/294 |
| 1,140,902 A * | 5/1915 | Harris | | 411/327 |
| 1,179,267 A * | 4/1916 | Baxter | | 411/327 |
| 1,210,669 A * | 1/1917 | Soltesz et al. | | 411/211 |
| 1,230,649 A * | 6/1917 | Barron | | 411/328 |
| 1,246,679 A * | 11/1917 | Stubblefield | | 411/296 |
| 1,263,948 A * | 4/1918 | Silva | | 411/292 |
| 1,277,146 A * | 8/1918 | Stanek | | 411/327 |
| 1,287,431 A * | 12/1918 | Quarles et al. | | 411/294 |
| 1,288,215 A * | 12/1918 | Savickis | | 411/326 |
| 1,294,995 A * | 2/1919 | Williams | | 411/298 |
| 1,309,421 A * | 7/1919 | Shults | | 411/298 |
| 1,321,212 A * | 11/1919 | Jarvis | | 411/327 |
| 1,355,342 A * | 10/1920 | Kellogg | | 411/327 |
| 1,362,509 A * | 12/1920 | Raspet | | 411/327 |
| 1,404,630 A * | 1/1922 | Miller et al. | | 411/296 |
| 1,414,761 A * | 5/1922 | Thamann | | 411/317 |
| 1,434,558 A * | 11/1922 | Merryman | | 411/326 |
| 1,437,871 A * | 12/1922 | Szymanski et al. | | 411/328 |
| 1,440,324 A * | 12/1922 | Whitaker | | 411/331 |
| 1,455,057 A * | 5/1923 | Lindsay | | 70/230 |
| 1,457,736 A * | 6/1923 | Johnson | | 411/315 |
| 1,460,412 A * | 7/1923 | Ftyklo | | 411/227 |
| 1,467,907 A * | 9/1923 | Miyagi | | 411/327 |
| 1,474,579 A * | 11/1923 | Comly | | 411/198 |
| 1,547,983 A * | 7/1925 | Weaver | | 411/228 |
| 1,570,002 A * | 1/1926 | Perry | | 411/327 |
| 1,573,328 A * | 2/1926 | Sale | | 411/205 |
| 1,596,799 A * | 8/1926 | Brugmann | | 411/316 |
| 1,624,764 A * | 4/1927 | Sale | | 411/294 |
| 1,639,211 A * | 8/1927 | Campo | | 411/318 |
| 1,722,231 A * | 7/1929 | Penney et al. | | 411/326 |
| 1,743,262 A * | 1/1930 | Bishop | | 411/296 |
| 1,744,121 A * | 1/1930 | Kaisler | | 411/298 |
| 1,913,453 A * | 6/1933 | Meyer | | 411/216 |
| 1,925,064 A * | 8/1933 | Wahlers | | 411/328 |
| 1,936,440 A * | 11/1933 | Soucie | | 411/327 |
| 2,044,667 A * | 6/1936 | Collins | | 411/328 |
| 2,073,612 A * | 3/1937 | Favatt | | 411/298 |
| 2,077,953 A * | 4/1937 | Pesce | | 411/328 |
| 2,372,884 A * | 4/1945 | Davis | | 411/300 |
| 2,372,889 A * | 4/1945 | Duggan | | 411/328 |
| 2,393,764 A * | 1/1946 | Frank | | 74/424.95 |
| 2,398,377 A * | 4/1946 | Johnston | | 411/301 |
| 2,766,798 A * | 10/1956 | Raspet | | 411/327 |
| 2,815,788 A * | 12/1957 | Tarwater | | 411/238 |
| 2,970,833 A * | 2/1961 | Stevens | | 269/43 |
| 3,149,654 A * | 9/1964 | Podell | | 411/304 |
| 3,180,390 A * | 4/1965 | Ockert, Jr. | | 411/348 |
| 3,272,249 A * | 9/1966 | Houston | | 411/318 |
| 3,530,757 A | 9/1970 | Osuga | | |
| 3,592,250 A * | 7/1971 | Petroshanoff | | 411/320 |
| 3,712,356 A * | 1/1973 | Petroshanoff | | 411/208 |
| 4,004,626 A * | 1/1977 | Biblin et al. | | 411/277 |
| 4,257,663 A * | 3/1981 | Brush et al. | | 439/321 |
| 4,458,574 A | 7/1984 | Hoshino | | |
| 4,553,890 A * | 11/1985 | Gulistan | | 411/318 |
| 4,667,562 A * | 5/1987 | Lee | | 84/422.3 |
| 4,692,077 A * | 9/1987 | Kerr et al. | | 411/206 |
| 4,725,174 A * | 2/1988 | Silcox | | 411/296 |
| 4,828,442 A * | 5/1989 | Duran | | 411/353 |
| 5,388,495 A * | 2/1995 | Atsumi | | G10D 13/065 |
| | | | | 84/422.3 |
| 5,415,072 A * | 5/1995 | Huang | | 84/422.3 |
| 5,438,903 A * | 8/1995 | Cropek | | 84/422.3 |
| 5,452,974 A * | 9/1995 | Binns | | 411/3 |
| 5,482,235 A * | 1/1996 | Atsumi | | G10D 13/065 |
| | | | | 248/121 |
| 5,573,311 A * | 11/1996 | Clohessy | | 301/105.1 |
| 5,668,332 A * | 9/1997 | Lombardi | | 84/422.3 |
| 5,752,793 A * | 5/1998 | Wu | | 411/303 |
| 5,808,217 A * | 9/1998 | Liao | | G10D 13/065 |
| | | | | 248/121 |
| 5,931,621 A * | 8/1999 | Griffith et al. | | 411/255 |
| 6,011,209 A * | 1/2000 | Liao | | 84/422.3 |
| 6,158,936 A * | 12/2000 | Thommes | | 411/304 |
| 6,177,621 B1* | 1/2001 | Hoshino | | 84/422.3 |
| 6,206,625 B1* | 3/2001 | Dessouroux | | 411/208 |
| 6,307,136 B1 | 10/2001 | Sikra et al. | | |
| 6,682,281 B1* | 1/2004 | Larsen | | 411/327 |
| 6,789,990 B1* | 9/2004 | Harris et al. | | 411/206 |
| 6,977,333 B2 | 12/2005 | Sutej | | |
| 7,276,654 B1 | 10/2007 | Parisi | | |
| 7,326,843 B2* | 2/2008 | Tanaka | | F16B 9/026 |
| | | | | 411/259 |
| 7,671,263 B1* | 3/2010 | Coady | | 84/422.3 |
| 8,136,428 B2* | 3/2012 | Engelbrecht | | 81/125 |
| 8,153,877 B2* | 4/2012 | Coady | | 84/422.1 |
| 8,338,682 B1 | 12/2012 | Sikra | | |
| 8,444,167 B1* | 5/2013 | Derdari | | 280/507 |
| 8,496,422 B2* | 7/2013 | Senaluck et al. | | 411/318 |
| 8,569,604 B1* | 10/2013 | Sikra | | G10D 13/065 |
| | | | | 84/422.4 |
| 8,865,988 B2* | 10/2014 | Nakata | | G10D 13/06 |
| | | | | 84/422.3 |
| 9,343,049 B1* | 5/2016 | Spriggel | | G10D 13/06 |
| 2009/0041560 A1 | 2/2009 | Lunden | | |
| 2009/0208309 A1 | 8/2009 | Engelbrecht | | |
| 2014/0096665 A1* | 4/2014 | Nakata | | G10D 13/06 |
| | | | | 84/422.3 |
| 2015/0096430 A1* | 4/2015 | Sikra | | 84/422.3 |

OTHER PUBLICATIONS

Written Opinion from Appl. No. PCT/US14/59155, dated Mar. 19, 2015.

* cited by examiner

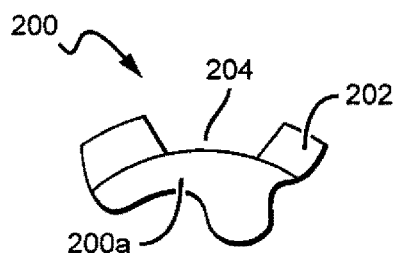
FIG. 4A
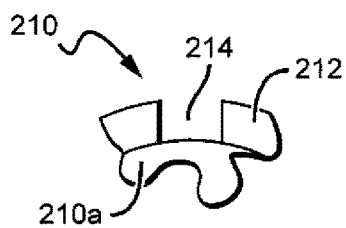
FIG. 4B
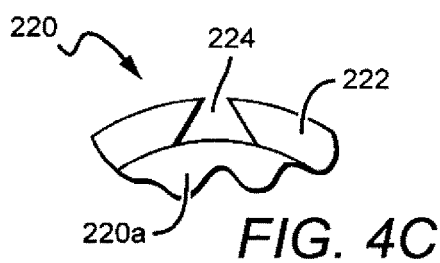
FIG. 4C
FIG. 4D
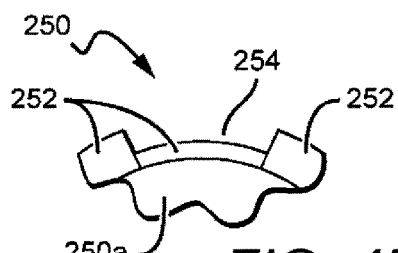
FIG. 4E
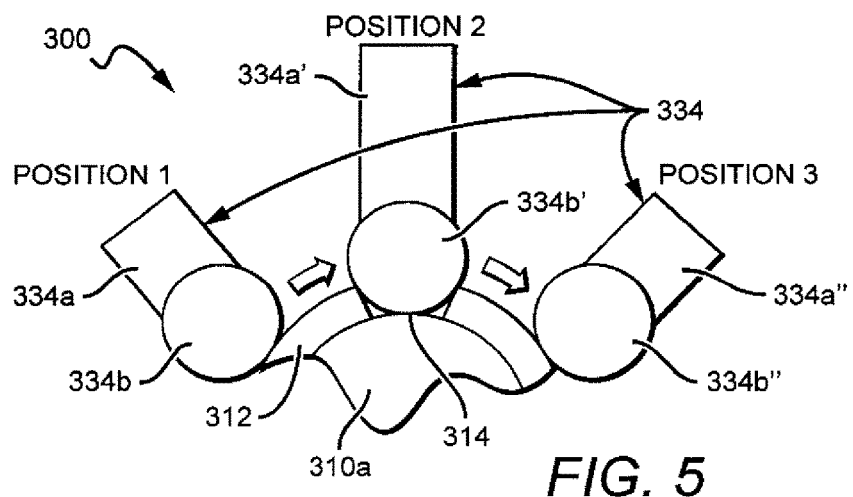
FIG. 5

CYMBAL HOLDER WITH SLOTTED THREADS AND PLUNGER

This application claims the benefit of U.S. Provisional Patent Application 61/886,505 to Sikra, filed on Oct. 3, 2013, which is fully incorporated by reference herein in its entirety.

BACKGROUND OF THE INVENTION

Field of the Invention

This invention relates generally to attachment mechanisms. Specifically, this invention relates to attachment mechanisms such as clutches that can be used in conjunction with other parts to form a hi-hat, a common device including a cymbal and stand that is commonly used as part of a drum kit.

Description of the Related Art

A hi-hat is a common component of a drum set that can include two cymbals facing one another and mounted on a vertical tube or pole. A traditional hi-hat 10 is shown in FIG. 1. The hi-hat 10 includes a pedal 12, legs 14, and a tube 16, with a bottom cymbal 20 mounted to the tube 16. A rod 18, sometimes known as a "pull rod," can run through the tube 16, the bottom cymbal 20, and optionally through a top cymbal 22. The top cymbal 22 can be mounted to the rod 18. The rod 18 can be connected, such as mechanically connected, to the pedal 12, such that when the pedal is actuated or pushed downward, the rod is displaced downward. This causes the top cymbal to move downward and contact the bottom cymbal 20. While the use of a foot pedal is the traditional actuation method, a drum stick can also be used to strike one or more of the cymbals 20,22.

The top cymbal 22 can be connected to the rod 18 by a clutch (not shown in FIG. 1). FIG. 2 shows a prior art clutch 50, which can be, for example, a clutch available from Drum Workshop, Inc. of Oxnard, Calif. The components of the clutch can combine to define an axial hole through which a rod such as the rod 18 can pass. The clutch 50 can include a tightening mechanism, such as a wing screw 52, which can be used to tighten the clutch to the rod 18. The main piece of the clutch 50 can be a bolt 60, which can include a threaded outside surface. Top and bottom nuts 54a,54b, and top and bottom pads or stoppers 56a,56b can be included on and around the bolt 60. Typically, the bottom nut 54b is locked into place in order to set the distance between a top cymbal 70 and a bottom cymbal (not shown). The location of the top nut 54a can then be adjusted in order to determine the pressure with which the top cymbal 70 is held between the pads 56a,56b. The lower the nut 54a is located, the more compressed and tighter the cymbal 70 will be between the pads 56a,56b, while the higher the nut 54a is located the looser the cymbal 70 will be held. Different drummers prefer different tightnesses for the top cymbal or "hat" 70, with looser settings producing a sloshier sound which takes longer to dissipate.

The top cymbal can be adjusted so as to be, for example, separated from the bottom cymbal, to be in loose contact with the bottom cymbal, or to be in tight contact with the bottom cymbal. This can be achieved by adjusting the placement of the lower nut 54a, or in embodiments using a bottom flange, by adjusting the placement of the clutch as a whole on the pull rod. Many different types of clutch are available, including the drop clutch, which can allow for the release of the top cymbal such that it rests on the bottom cymbal, allowing a drummer to use both feet to play bass drums while actuating the hi-hat cymbals with a drum stick.

The use of a drum set can involve many violent and rapid movements. These movements can cause the undesired displacement of components of the drum set including, for example, the top nut of a clutch, which controls the tightness with which the top cymbal is held. Such undesired movements can cause components such as the clutch and/or top cymbal to be out of proper adjustment.

BRIEF DESCRIPTION OF THE DRAWINGS

FIGS. 4A-4E are cross-sectional views of different slot cross-sections according to some embodiments of the present invention;

FIG. 5 is a side view of a threaded bolt and a plunger according one embodiment of the present invention;

DETAILED DESCRIPTION OF THE INVENTION

Figure 1:
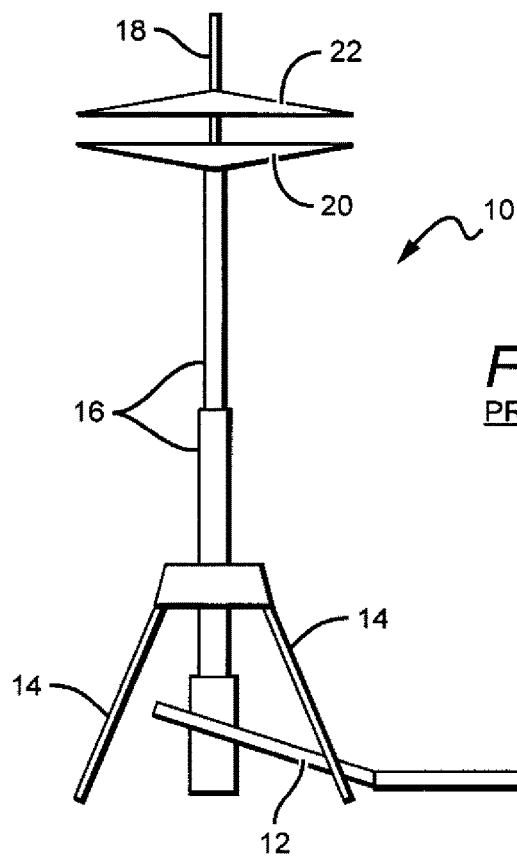
FIG. 1 is a side view of a hi-hat assembly according to the prior art.
Figure 2:
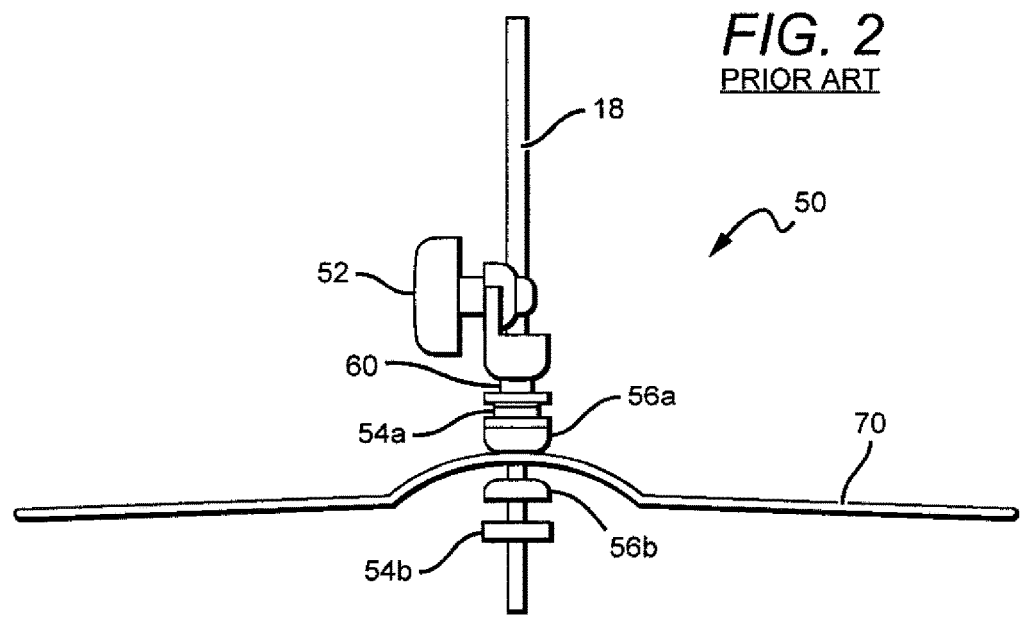
FIG. 2 is a side view of a clutch according to the prior art.

The present invention relates to an assembly for securing an item such as a cymbal into a locked position. The assembly can include a nut and threaded bolt system. The threads can include one or more slots running approximately perpendicular to the threads, and the nut can include an indexing means such as a plunger that can lock into place within a slot. Locking the nut into place can prevent undesired movement of the nut during playing of the hi-hat.

Each of U.S. Pat. No. 6,307,136 to Sikra et al. and entitled "Percussion Instrument Actuator Assembly," U.S. Pat. No. 6,977,333 to Sutej and entitled "Remote Hi-Hat Apparatus Operated by the Foot Pedal of the First Hi-Hat Apparatus," and U.S. Pat. No. 8,338,682 to Sikra and entitled "Cymbal Holder with Barb Means Retention of Cushion Pad" is commonly assigned with the present application and is incorporated by reference herein in its entirety. Elements of assemblies shown in each of these patents can be incorporated into devices according to the present invention. Such elements include but are not limited to elements shown in these patents as parts of a clutch and/or hi-hat assembly.

It is understood that when an element is referred to as being "on" another element, it can be directly on the other element or intervening elements may also be present. Furthermore, relative terms such as "inner", "outer", "upper", "top", "above", "lower", "bottom", "beneath", "below", and similar terms, may be used herein to describe a relationship of one element to another. Terms such as "higher", "lower", "wider", "narrower", and similar terms, may be used herein to describe angular relationships. It is understood that these terms are intended to encompass different orientations of the elements or system in addition to the orientation depicted in the figures.

Although the terms first, second, etc., may be used herein to describe various elements, components, regions and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present invention.

Embodiments of the invention are described herein with reference to view illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region and are not intended to limit the scope of the invention.

FIGS. 3A-3E show a clutch 100 according to an embodiment of the present invention. The clutch 100 can include a threaded bolt 110, a tightening mechanism 102 for attaching the clutch to a pull rod, a bottom flange 104, and top and bottom pads or stoppers 106a,106b. The clutch 100 can also include a top nut 130, which can itself include one or more grooves 132 for ease of turning. It is understood that while the clutch 100 includes a top nut 130 and a bottom flange 104, other embodiments of the present invention can include a top flange and a bottom nut, or can include top and bottom nuts, one embodiment of which will be shown in FIG. 6.

The threaded bolt 110 can be essentially cylindrical and include an outside surface having raised threads 112 which can be equidistant from one another, although other embodiments are possible. The raised threads 112 can be close to horizontal and spiral the length of the threaded bolt 110. However, unlike a typical threaded bolt, the threaded bolt 110 can include slots 114, which can be defined by the raised threads 112. The slots 114 can, for example, run parallel to the length of the threaded bolt 110, as shown, although other embodiments are possible. In an embodiment where the slots 114 run approximately parallel to the length of the threaded bolt 110, the slots 114 can be close to perpendicular to the raised threads 112. The slots 114 can include areas of the bolt 110 which would otherwise be occupied by the raised threads 112. While the slots 114 are shown as linear, other embodiments are possible.

Clutches and/or bolts according to the present invention can include one or more slots, such as the slot 114. In different embodiments, a clutch and/or bolt can include one slot, two slots, or more, with one particular embodiment including four slots. In one embodiment the slots are radially equidistant from one another, although other embodiments are possible.

Drummers may often make forceful and rapid movements while playing. In a traditional clutch using a threaded bolt, this may cause the bolt to move, which can be undesirable in that it alters the drummer's chosen hi-hat configuration. The clutch 100, however, can reduce and/or prevent this problem through the use of the slot(s) 114 in the threaded bolt 110 and an indexing means such as a plunger 134 in the top nut 130. The plunger 134 can be any type of plunger device known in the art, such as a spring plunger, a ball plunger, a spring and ball plunger, a hand retractable plunger, an indexing plunger, or any type of plunger or equivalent. The head of the plunger can, for example, be threaded into the nut, attached using an adhesive, or secured in some other way to provide a base from which the remainder of the plunger can spring. Some other embodiments of indexing means include items pressed against the bolt with a force provided by another object, such as an O-Ring, which will be described in detail below with regard to FIG. 7. Other devices performing the same function as a plunger or O-Ring configuration can also be substituted for the plunger 134. It is understood that the term "indexing means" as used herein is intended to encompass all devices which perform the same or similar functions, and different indexing means can be substituted for one another unless specifically stated otherwise. The plunger 134 can "catch" in the slot 114 or engage the slot 114 to achieve a locked position. In one embodiment, from a locked position the top nut 130 can only be moved to an unlocked position only by a force greater than that required to turn the nut when in an unlocked position.

Figure 3A:
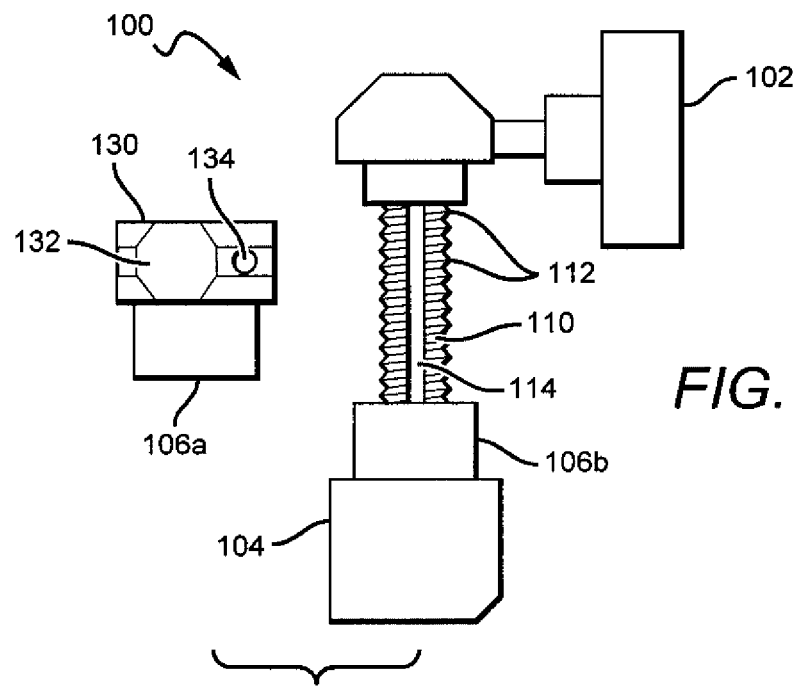
FIG. 3A is a partially disassembled side view of a clutch according to an embodiment of the present invention.
Figure 3B:
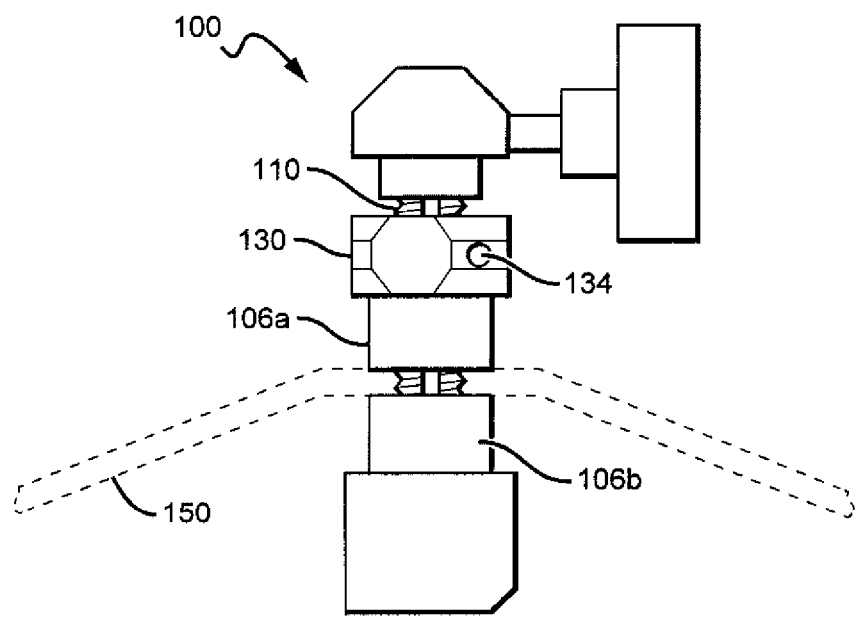
FIGS. 3B and 3C are side and cut-away views of the clutch seen in FIG. 3A in a first position.
Figure 3C:
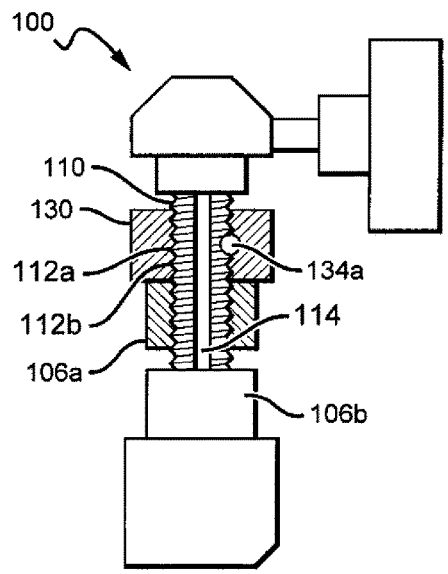

The locking process is shown in detail in FIGS. 3A-3E. FIG. 3A shows a partially exploded view of the clutch 100, with the nut 130 and top stopper 106a separate from the remainder of the clutch 100, including the bottom stopper 106b and bolt 110 with threads 112 and slots 114. FIG. 3B shows the clutch 100 in an unlocked position, wherein the plunger 134 is not engaged with the slot 114. A cymbal 150 is shown compressed between the top and bottom stoppers 106a,106b, and although omitted in FIGS. 3A and 3C-3E it is understood that the cymbal can be present in any embodiment shown or described herein. FIG. 3C shows a cut-away view of the view shown in FIG. 3B. As can be seen, an end point or ball 134a of the plunger 134 is not in the slot 114, but is instead resting on two threads 112a,112b. In the embodiment shown, the ball 114 has a diameter that is slightly larger and/or larger than the distance between threads, such as the threads 112a,112b. Other embodiments are possible.

Figure 3D:
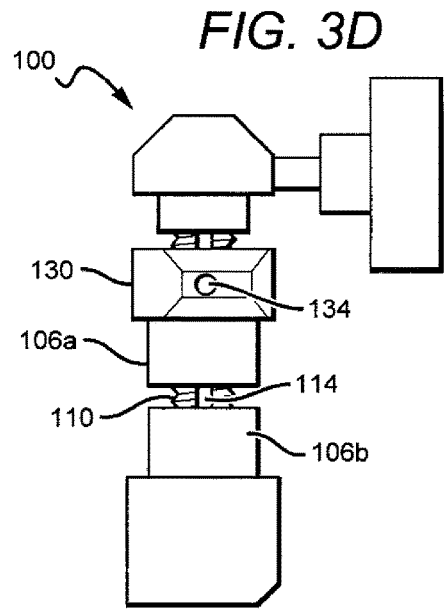
FIGS. 3D and 3E are side and cut-away views of the clutch seen in FIG. 3A in a second position.
Figure 3E:
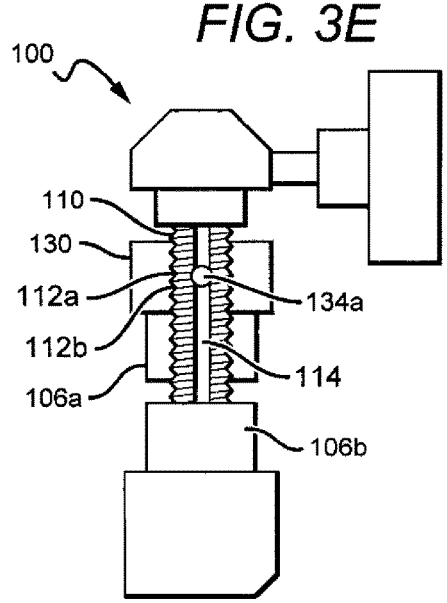

FIG. 3D shows the clutch 100 after the nut has been rotated such that the plunger 134 engages the slot 114. As can be seen in the cut-away view of FIG. 3E, the ball 134a is within the slot 114. The slot 114 can have a width that is approximately equal to, slightly larger than, and/or larger than the diameter of the ball 134a, in order to allow the ball 134a to engage the slot 114 and achieve a locked position. Once in the locked position, in one embodiment only a force greater than that required to rotate the nut 110 while in an unlocked position can cause the plunger 134 and/or ball 134a to be disengaged from the slot 114.

Clutches according to the present invention can be designed based on the desired force required to remove the plunger from a slot. FIGS. 4A-4D show partial cross-sections of bolts 200,210,220,230. The bolt 200 in FIG. 4A can include threads 202 that define a slot 204 with sidewalls that are approximately normal to the outer surface of the core 200a. FIG. 4B shows a bolt 210 in which the slot 214 is arranged normal to the outer surface of the core 210a, with the threads 212 defining the slot 214 with sidewalls that are approximately parallel to one another. This configuration can require more force to remove a plunger from the slot than that shown in FIG. 4A. FIG. 4C shows a bolt 220 which can require even more force to remove a plunger, with the threads 222 defining a slot 224 with sidewalls that are acute and/or that angle toward one another as they move away from the core 220a. Finally, FIG. 4D shows a bolt 230 with threads 232 defining a slot 234 with sidewalls that form an angle with the core 230a that is obtuse and/or even greater than normal. Of the embodiments shown, this embodiment would require the least amount of force to remove a plunger from the slot 234. While the embodiments shown include sidewalls that are mirror images of one another, other embodiments are possible, such as an embodiment where one sidewall is normal to a thread core and another sidewall is obtuse. Embodiments are possible where tightening the nut to further compress a cymbal is easier than loosening the nut, or vice versa. This can be achieved based on the design of the side walls in the threaded bolt slots.

While the embodiments in FIGS. 4A-4D show slots which reach the core of the bolt, other embodiments include slots which do not reach the core. For example, FIG. 4E shows an embodiment similar to that shown in FIG. 4A. However, the slot does not reach all the way to the core 250a, and instead a portion of the thread 252 defines the bottom of the slot 254. It is understood that any of the embodiments described herein can have thread styles similar to that of 252 with a thread portion defining the bottom of the slot.

As previously described, a plunger can include a spring-like device, such as a spring, that holds an end point such as a ball against one or more raised threads. For instance, FIG. 5 shows a device 300 with a plunger 334 having a spring device 334a and an end point, such as a ball 334b. The ball 334b can be held between two parallel threads 312 such that the ball 334b does not contact a core 310a of the bolt. This is similar to the configuration shown in FIG. 3D, where the end point of the plunger 134 is resting on two threads 112a,112b. When the nut is turned, the spring 334a can expand (as shown by 334a') to push the ball 334b' into the slot 314, moving from Position 1 to Position 2. In an alternate embodiment where element 334a is rigid, a holding means can exert pressure on element 334a/334b to move it downward into the slot 314; one such embodiment will be described below with regard to FIGS. 7A-7D.

When the nut is turned again, such as by a force greater than that required to move the ball from Position 1 to Position 2, the ball 334b'/334b" can move from Position 2 (inside the slot 314) to Position 3 (outside the slot 314), with the spring 334a'/334a" contracting. The force required to move from Position 2 to Position 3 can be greater than the typical force placed on the nut during drumming, thus reducing or preventing unwanted movement of the nut.

Figure 6:
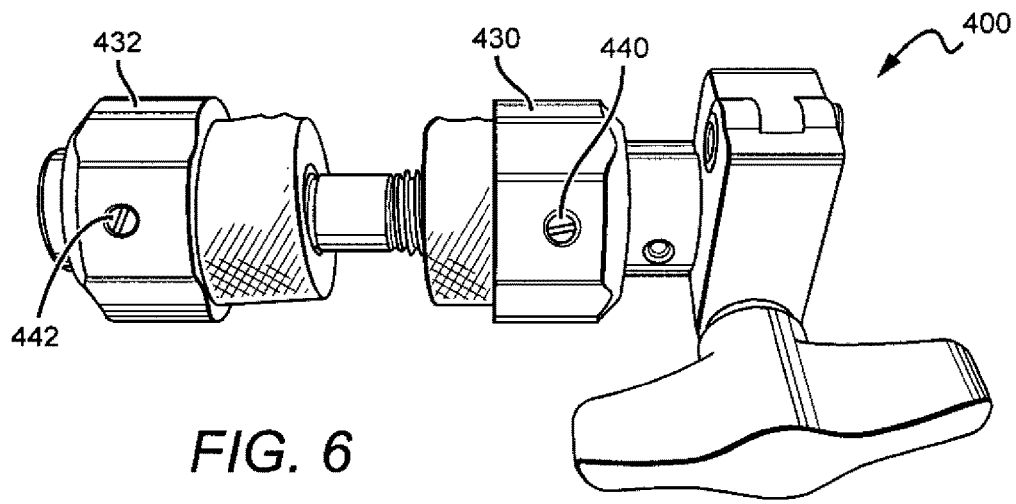
FIG. 6 is a perspective view of a clutch according to another embodiment of the present invention.

As previously described, embodiments of clutches according to the present invention can include two nuts that can use the threaded bolt systems previously described. FIG. 6 shows a clutch 400 which includes top and bottom nuts 430,432 including plungers 440,442, respectively. The plungers 440,442 can be screwed into the nuts 430,432 such that the heads 440a,442a of the plungers 440,442 are secured in place, as previously described. The use of a double bolt system such as that shown can allow a drummer to adjust the distance between cymbals without adjusting the placement of the clutch as a whole on the pull rod.

Figure 7A:
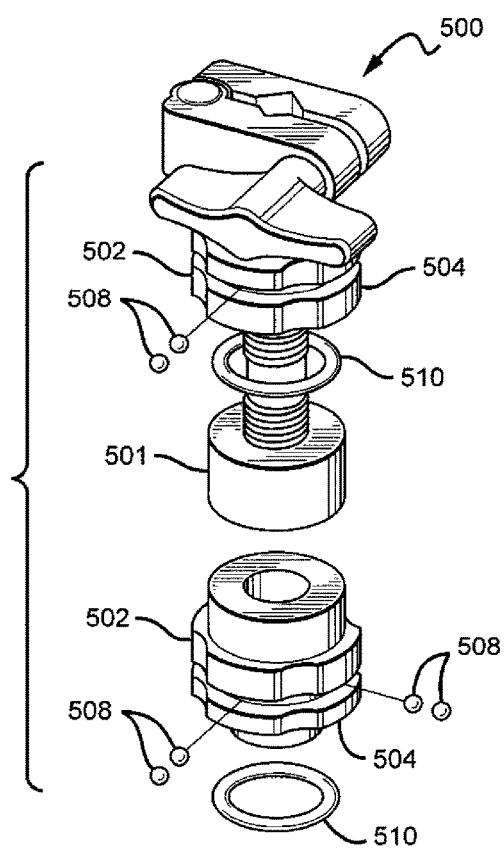
FIGS. 7A-7D are perspective views of a clutch according to another embodiment of the present invention.
Figure 7B:
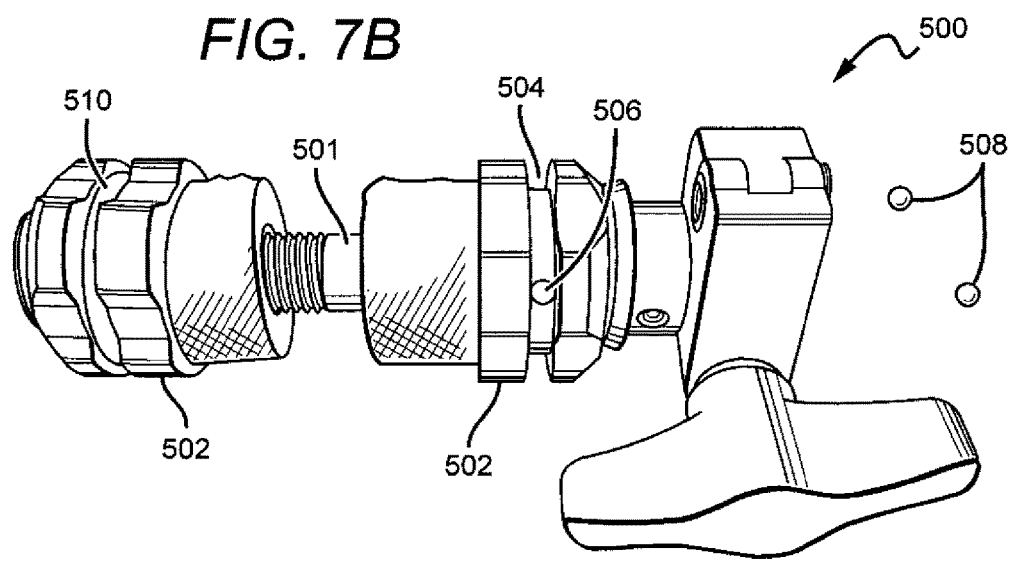
Figure 7C:
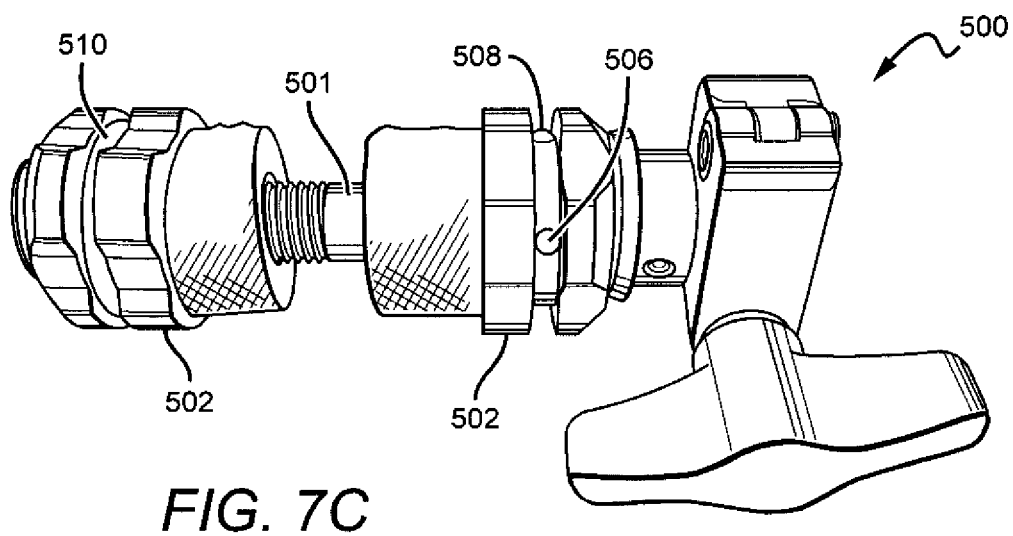
Figure 7D:
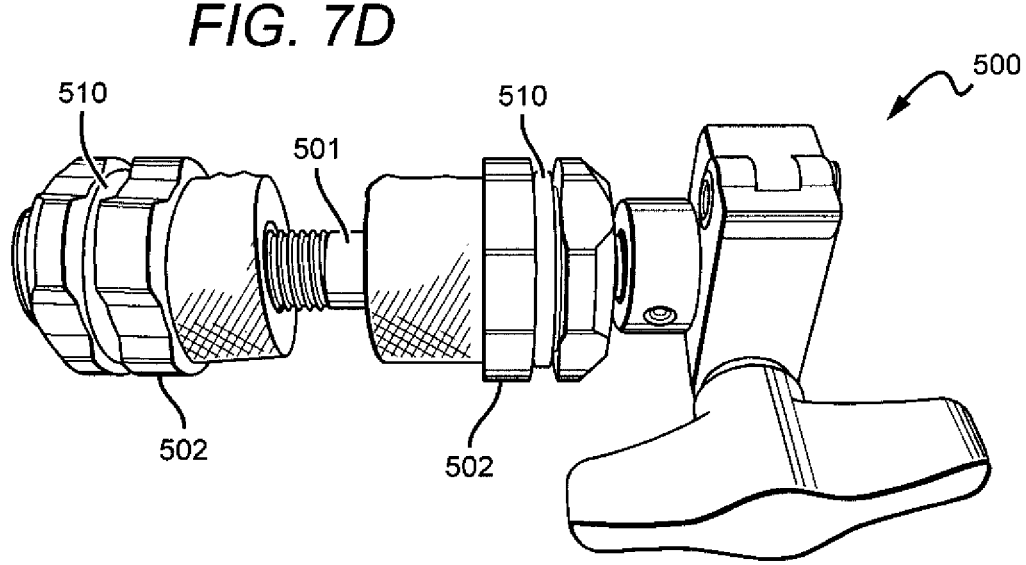

Embodiments of the present invention can include systems without traditional plungers. For example, FIGS. 7A-7D show an embodiment of a clutch 500 that can include a bolt 501 and one or more nuts 502. The bolt 501 can be similar to or the same as any of the slotted threaded bolts previously described. FIG. 7A shows the clutch 500 in a disassembled state, FIGS. 7B and 7C shows the clutch 500 in a partially assembled state, and FIG. 7D shows the clutch 500 in an assembled state. The nut(s) 502 can define a channel 504, and a hole 506 can be included through the bottom of the channel 504 and the remainder of the nut 502. An indexing means can be placed in the hole and then held in place by a holding means, such as an O-Ring 510, which can be partially or wholly within the channel 504. Holding means can also operate without a channel. The topmost portion of the indexing means can remain above the hole 506 when not engaging a slot, and in one embodiment also when engaging a slot, as best seen in FIG. 7C. This can allow the holding means 510 to exert pressure on the indexing means. The holding means can be elastic and/or have a certain amount of give, which can allow the indexing means to move into and out of the underlying slots.

In one embodiment, the indexing means can include one or more ball bearings 508, such as ball bearings having a diameter of 5 mm or less and/or ball bearings having a diameter of about 3 mm. Other dimensions are possible. Another indexing means that can be included in embodiments of the present invention can include a pin, such as a pin with a head that is pressured by a holding means such as an O-Ring. Many different indexing means are possible. In previously described systems where a plunger is screwed into a nut, a spring provides the elasticity allows the plunger end point to move into and out of the underlying slots while the head of the system remains static. In the FIGS. 7A-7D embodiment and similar embodiments, however, the indexing means remains rigid while the holding means on the outside of the nut provides elasticity.

As shown in FIG. 7A, different numbers of indexing means can be used. For example, the top nut 502 in FIG. 7A includes only a single indexing means, a set of two ball bearings 508 (although in another embodiment one ball bearing or three or more ball bearings can be used). In other embodiments, a nut can include two or more indexing means, such as the bottom nut 502 in FIG. 7A which includes two or more sets of ball bearings 508. The use of more indexing means can increase the amount of force needed to displace each indexing means from its respective slot and rotate the nut.

It is understood that one of the advantages of the clutches according to the present invention and described herein is that they allow for easy and controlled adjustment relational distance the cymbals in a high hat. In particular, the nuts in the clutches can be easily adjusted by hand to vary the relational distance, and this can be accomplished using one hand. The indexing means and slot not only help to hold the nut in the desired location, the user can feel the indexing means engage and disengage from the slot while turning the nut. This gives direct feedback to the user as to how far the nut has been tightened by understanding whether each slot is a ¼ turn, ½ turn, etc. The present invention is particularly adapted to allow for adjustment using one hand, while still playing the other elements of the drum set. This allows for the user to make quick and controlled adjustments during a song or show, without interruption.

Although the present invention has been described in detail with reference to certain preferred configurations thereof, other versions are possible. Therefore, the spirit and scope of the invention should not be limited to the versions described above.

I claim:

1. A clutch for use in a percussion system, comprising:
   a bolt comprising threads and shaped to define a first slot; and
   a nut attached to said bolt and rotatable about said bolt by a minimum force;
   an indexing means at least partially within said nut; and
   a holder exerting pressure on said indexing means toward said bolt;
   wherein said indexing means is configured to engage said first slot;
   wherein the force required to rotate said nut to disengage said indexing means from said first slot is greater than said minimum force; and
   wherein the force required to rotate said nut to disengage said indexing means from said first slot is the same in a first rotational direction as it is in a second rotational direction opposite said first rotational direction.

2. The clutch of claim 1, further comprising a second indexing means and a second slot;
wherein the force required to rotate said nut to disengage said second indexing means from said second slot is greater than said minimum force; and
wherein the force required to rotate said nut to disengage said indexing means from said second slot is the same in a first rotational direction as it is in a second rotational direction opposite said first rotational direction.

3. The clutch of claim 2, wherein said indexing means is a first indexing means, and wherein said first and second indexing means are on opposite sides of said bolt.

4. The clutch of claim 1, wherein said indexing means comprises a plunger end.

5. The clutch of claim 1, wherein said holder comprises a spring.

6. The clutch of claim 5, wherein said holder further comprises a plunger head that is screwed into said nut.

7. The clutch of claim 1, wherein said holder comprises an elastic material.

8. The clutch of claim 1, wherein said holder is an O-Ring.

9. The clutch of claim 1, wherein said indexing means comprises one or more ball bearings.

10. The clutch of claim 1, wherein said indexing means comprises a pin.

11. The clutch of claim 1, wherein said nut is shaped to define a channel around its perimeter; and
wherein said holder is at least partially within said channel.

12. The clutch of claim 11, wherein said holder is at least partially within said channel and encircles said nut.

13. The clutch of claim 1, wherein tightening said nut from a locked position requires approximately the same force as loosening said nut from said locked position.

14. The clutch of claim 1, wherein said first slot comprises sidewalls that are normal or obtuse to a core of said bolt.

15. The clutch of claim 1, wherein said first slot comprises first and second sidewalls which are mirror images of one another.

16. The clutch of claim 1, wherein said indexing means is configured to engage said first slot by moving substantially normal to a core of said bolt.

17. A nut and bolt system, comprising:
a bolt comprising threads shaped to define at least a first slot;
a nut rotatably attached to said bolt;
a plunger movably attached to said nut, said plunger comprising a plunger end;
wherein said plunger is configured to engage said first slot by moving normal to a core of said bolt; and
wherein said first slot comprises sidewalls that are mirror images of one another such that the force required to rotate said nut about said bolt such that said plunger disengages from said first slot is substantially equal in both rotational directions.

18. The system of claim 17, further comprising a plunger head that is screwed into said nut, said plunger head attached to said plunger.

19. The system of claim 18, further comprising a spring between said plunger head and said plunger end, said spring biasing said plunger end toward said bolt.

20. The system of claim 17, wherein the diameter of said plunger end is larger than the distance between two of said threads such that said plunger end rests on two of said threads.

21. A percussion assembly, comprising:
a rod;
a clutch removably attached to said rod, said clutch comprising:
a bolt comprising threads and shaped to define a first slot;
a nut attached to said bolt and rotatable about said bolt by a minimum force;
an indexing means at least partially within said nut;
a holder exerting pressure on said indexing means toward said bolt; and
top and bottom stoppers below or above said nut, said top and bottom stoppers configured to compress a cymbal;
wherein the force required to rotate said nut to disengage said indexing means from said first slot is greater than said minimum force; and
wherein the force required to rotate said nut to disengage said indexing means from said first slot is the same in a first rotational direction as it is in a second rotational direction opposite said first direction.

22. The assembly of claim 21, wherein said top stopper is attached to a bottom of said nut.

23. The assembly of claim 21, wherein said indexing means is configured to engage said first slot by moving normal to said core of said bolt during rotation of said nut.

24. The assembly of claim 14, wherein said bolt is shaped to define a second slot opposite said first slot.

25. The assembly of claim 14, wherein said first slot comprises first and second sidewalls which are mirror images of one another.

26. The assembly of claim 21, further comprising a top cymbal compressed between said top and bottom stoppers.

27. The assembly of claim 26, wherein said nut is operable to adjust the compression with which said top cymbal is held between said top and bottom stoppers.

28. The system of claim 17, wherein said plunger is configured to engage said one of said slots by moving normal to said core of said bolt during rotation of said nut.

29. The system of claim 17, wherein said threads are shaped to define a second slot, and wherein said second slot comprises sidewalls that are mirror images of one another such that the force required to rotate said nut about said bolt such that said plunger disengages from said second slot is substantially equal in both rotational directions.

30. The system of claim 17, further comprising a holder exerting pressure on said plunger toward said bolt.

31. The system of claim 30, wherein said holder is an O-ring.

32. The system of claim 17, further comprising a spring which biases said plunger end toward said bolt.

33. The system of claim 17, wherein said plunger end comprises a ball bearing.

* * * * *